US005670712A

United States Patent [19]
Cleveland et al.

[11] Patent Number: 5,670,712
[45] Date of Patent: Sep. 23, 1997

[54] METHOD AND APPARATUS FOR MAGNETIC FORCE CONTROL OF A SCANNING PROBE

[75] Inventors: Jason Cleveland; Paul Hansma, both of Santa Barbara, Calif.; William Ducker, Dunedin, New Zealand

[73] Assignee: The Regents of the University of California, Alameda, Calif.

[21] Appl. No.: 290,091

[22] Filed: Aug. 15, 1994

[51] Int. Cl.$^6$ ...................................................... G01B 5/28
[52] U.S. Cl. ................................................................ 73/105
[58] Field of Search ............................... 73/105, 306, 307

[56] References Cited

U.S. PATENT DOCUMENTS

| | | | |
|---|---|---|---|
| 4,883,959 | 11/1989 | Hosoki et al. | 250/306 |
| 5,461,907 | 10/1995 | Tench et al. | 73/105 |
| 5,465,046 | 11/1995 | Campbell et al. | 324/244 |
| 5,468,954 | 11/1995 | Tohda et al. | 73/105 X |
| 5,513,518 | 5/1996 | Lindsay . | |
| 5,515,719 | 5/1996 | Lindsay . | |

FOREIGN PATENT DOCUMENTS

| | | | |
|---|---|---|---|
| 203626 | 8/1993 | Japan | 73/105 |
| 59004 | 3/1994 | Japan | 73/105 |
| 273155 | 9/1994 | Japan | 73/105 |

OTHER PUBLICATIONS

"Scanning tunneling microscopy and atomic force microscopy studies of biomaterials at a liquid–solid interface.", S.M. Lindsay et al., J Vac. Sci. Technol. A I 1 (4), Jul./Aug. 1993, pp. 808–815.

"Atomic force microscope with magnetic force modulation." E.L.Florin et al., Rev. Sci. Instrum., 65(3), Mar. 1994, pp. 639–643.

"Force microscopy imaging in liquids using ae techniques.", M.A. Lantz et al., V/ Appl. Phys. Lett. 65(4), Jul. 1994, pp. 409–4 1.

"Imaging viscoelasticity by force modulation with the atomic force microscope.", M.Radmacher et al., Biophys. J., vol. 64, Mar. 1993, pp. 735–742.

"A new force controlled atomic force microscope for use in ultrahigh vacuum.", S.P. Jarvis et al. Rev. Sci. Instrum., 67(6), Jun. 1996, pp. 2281–2285.

"Force feedback surface force apparatus: Principles of operation", A.M. Stewart and J.L. Parker. Rev. Sci. Instrum., 63(12), Dec. 1992.

"Optimal control of force microscope cantilevers, H. Magnetic coupling implementation" K.J.Bruland, J.L. Garbini, W..M.Dougherty, J.A.Sidles. J.Appl. Phys. 80, pp. 1959–1964 Aug. 1996.

"A novel force microscope and point contact probe", Jarvis et al., Rev. Sci. Instrum. 64 (12), Dec. 1993, pp. 3515–3520.

"A new force sensor incorporating force–feedback control for interfacial force microscopy", Joyce et al., Rev. Sci. Instrum, vol. 62, No. 3, Mar. 1991.

(List continued on next page.)

*Primary Examiner*—Hezron E. Williams
*Assistant Examiner*—Daniel S. Larkin
*Attorney, Agent, or Firm*—Robbins, Berliner & Carson

[57] ABSTRACT

A method and apparatus of magnetic force control for a scanning probe, wherein a first magnetic source having a magnetic moment is provided on the scanning probe and a second magnetic source is disposed external to the scanning probe to apply a magnetic field in a direction other than parallel, and preferably perpendicular, to the orientation of the magnetic moment, from the second magnetic source to the first magnetic source to produce a torque related to the amplitude of the applied magnetic field acting on the probe. By controlling the amplitude of the applied magnetic field, the deflection of the scanning probe is maintained constant during scanning by the scanning probe. An output signal related to the amplitude of the magnetic field applied by the second magnetic source is produced and is indicative of a surface force applied to the probe. The invention can also be used to apply large forces during scanning for applications such as nanolithography or elasticity mapping.

49 Claims, 10 Drawing Sheets

OTHER PUBLICATIONS

"A rocking beam electrostatic balance for the measurement of small forces", Grigg, Rev. Sci. Instrum. 62 (3), Mar. 1991.

"Rocking-beam force-balance approach to atomic force microscopy", Grigg et al., Ultramicroscopy 42-44 (1992) 1504-1508.

"Regulation of a microcantilever response by force feedback", Mertz et al., Appl. Phys. Lett. 62 (19), 10 May 1993, pp. 2344-2346.

"Direct Measurement of the Short-Range Interaction between a Tungsten Tip and a Mica Surface", Gauthier-Manuel, Europhysics Letters, 17(8), pp. 195-200, 14 Jan. 1992.

"Surface force measurements on picometer and piconewton scales", Bryant et al., J. Vac. Sci. Technol. A8(4), Jul./Aug. 1990, pp. 3502-3505.

"Use of magnetic forces to control distance in a surface force apparatus", Stewart et al., Meas. Sci. Technol. 1 (1990) 1301-1303, Printed in the UK.

"Mechanical Parametric Amplification and Thermomechanical Noise Squeezing", Rugar et al., Physical Review Letters, vol. 67, No. 6, pp. 699-702.

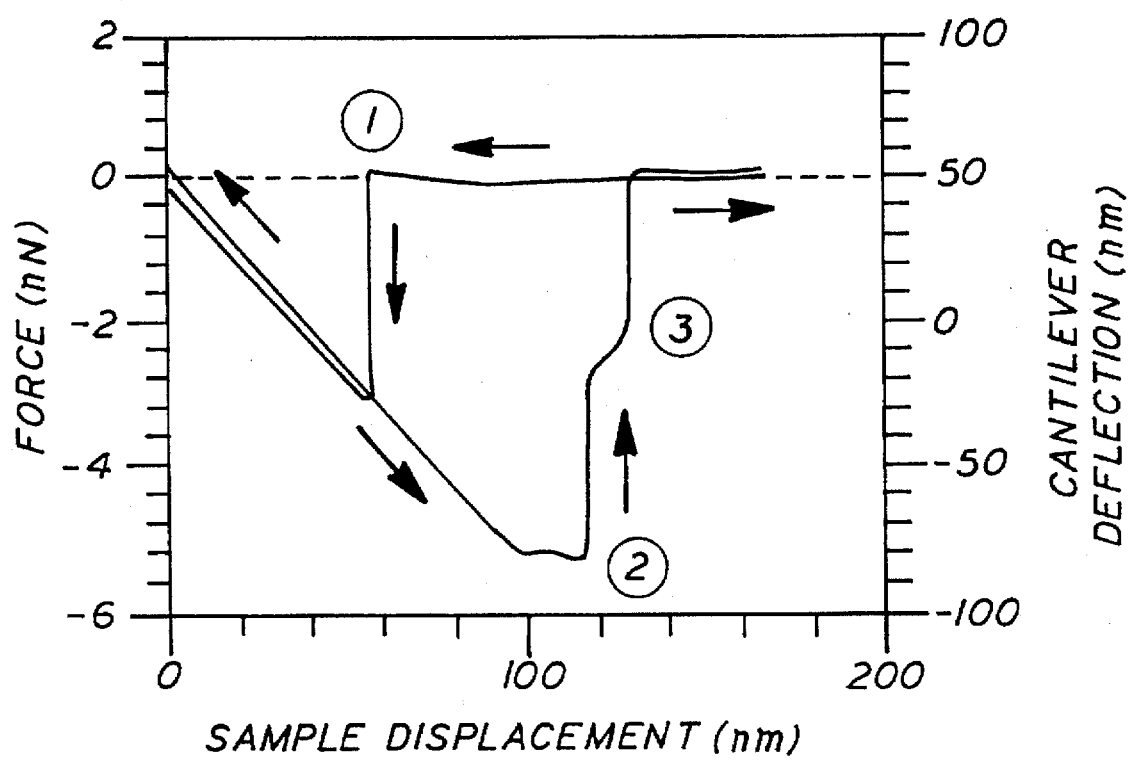

METHOD AND APPARATUS FOR MAGNETIC FORCE CONTROL OF A SCANNING PROBE

BACKGROUND OF THE INVENTION

1. Field of the Invention

This invention relates to scanning probe microscopy and, has application to specific types of scanning probe microscopes, such as the atomic force microscope. More particularly, the present invention relates to a method and apparatus of magnetic force control for scanning probe microscopy. Also, the invention has broader applications, such as in the field of nanolithography.

2. Discussion of Background

Atomic force microscopes are typically devices which have a relatively sharp tip and use low forces to profile a sample surface down to atomic dimensions. Often, atomic force microscopes have a tip on a flexible lever with the vertical position of the tip of the probe detected by a detector. Various detectors have been utilized, such as tunneling tips, optical interferometers and optical beam deflection. Also, various capacitive and inductive proximity detectors are known.

In operation, the atomic force microscope typically will scan the tip of the probe over the sample while keeping the force of the tip on the surface constant, such as by moving either the base of the lever or the sample upward or downward to maintain deflection of the lever portion of the probe constant. Therefore, the topography of a sample may be obtained from data on such vertical motion to construct three-dimensional images of the surface topography. It is also known that atomic force microscopes utilize analog and digital feedback circuits to vary the height of the tip of the probe or the sample based upon the deflection of the lever portion of the probe as an input. As to atomic force microscopes, see also for example, U.S. Pat. Nos. 5,025,658 and 5,224,376.

The contrast in an atomic force microscope image is due to spatial variations in the force between a probe and the surface. The most common mode of operation uses the short-ranged, Pauli exclusion ("hard-wall") force that arises when the electron clouds of atoms in the tip overlap those in the sample. It is the extremely high gradients of this force which give rise to the excellent resolution of the microscope. However, there are at least three disadvantages to operating in this mode. The downward forces on the entire tip (e.g. van der Waals, capillary forces and tracking forces) must be opposed by upward forces on the few atoms in contact with the surface. The large stresses generated can deform the tip and sample surface thus reducing lateral resolution. Another disadvantage is that when the tip slides in contact with the sample, there are additional lateral (frictional) forces that sometimes cannot be distinguished from normal forces. These lateral forces may also cause damage to the tip and sample. Finally, since the distance dependence of the "hard-wall" force is too steep to be resolved, the contrast is generated almost entirely by topography and, therefore, chemical or material information is unavailable.

Non-contact imaging has been used to circumvent these disadvantages. The forces that generate contrast in this mode are usually attractive (for example van der Waals, electrostatic, and magnetic). If the gradients in these forces exceed the stiffness of the cantilever, a mechanical instability will occur and the tip will snap to the surface. Thus, there is a range of tip-sample separations that are mechanically unstable and, therefore, unsuitable for imaging. For this reason, non-contact imaging is usually performed at large (>10 nm) tip-sample separations. However, resolution increases with decreasing tip-sample separation, so imaging at a small tip-sample separation would be desirable if stability could be achieved. Stability can be achieved by the application of an externally controllable force on the tip and the use of feedback. Externally controllable forces have been applied in atomic force microscopes operating in air using electrostatic forces (S. A. Joyce and J. E. Houston, Rev. Sci. Instr., 62, 710 (1991); G. I. Miller, J. E. Griffith and F. R. Wagner, Rev. Sci., Instrum., 62, 705 (1991); and D. A. Grigg, P. E. Russell and J. E. Griffith, Ultramicroscopy, 42–44, 1504 (1992)), thermal stresses (J. Mertz, O. Marti and J. Mlynek, Appl. Phys. Lett., 62, 2344 (1993)), magnetic force gradients (B. Gauthier-Manuel, Europhys. Lett., 17, 195 (1992)) and inertial forces (P. J. Bryant, H. S. Kim, R. H. Deeken and Y. C. Cheng, J. Vac. Sci. Technol., A 8, 3502 (1990)).

The importance of minimizing imaging forces to decrease sample damage and to improve resolution in contact-mode atomic force microscopy is well known. In non-contact atomic force microscopy better force resolution also means increased spatial resolution. Since the force resolution is set by the smallest deflection of the cantilever detectable, weaker cantilevers typically mean lower imaging forces and are therefore desirable. However, on the other hand, there are many applications where large forces or spring stiffness are advantages or perhaps even necessary. Although larger forces and spring constants can be achieved with stiffer cantilevers, this almost always leads to decreased force resolution and higher imaging forces. It is known that a cantilever may experience a mechanical instability and may snap to the surface when the attractive force gradient exceeds the spring constant. Although it is known to use stiffer cantilevers to allow surface forces to be measured at closer surface separations, such use of stiffer cantilevers also decreases the force resolution.

Another apparatus known in the prior art is the surface force apparatus which measures the force between two surfaces. However, with the surface force apparatus, the length scale is much larger than with the scanning probe microscope. Typically, for example, the radii of curvature of the surfaces are 2 cm which may limit the choice of samples. Further, with the surface force apparatus, the apparatus does not have imaging capabilities.

Also, it is known to use magnetic field gradients to generate magnetic forces to act on a magnetic moment rather than torques on a moment. See, for example, "*Use of magnetic forces to control distance in surface force apparatus*", Stewart et al, Meas. Sci. Techno. 1, pages 1301–1303 (1990); and "*Direct Measurement of the Short-Range Interaction between a Tungsten Tip and a Mica Surface*", B. Gauthier-Manuel, Europhysics Letters, 17, pages 195–200, (1992, published in December, 1991).

FIG. 6A is a schematic illustration of the conventional application of a magnetic field gradient to produce a force F acting on a magnetic moment m. In FIG. 6A, a magnetic moment m is oriented parallel to the direction of the magnetic field gradient B. While a force is experienced that is proportional to the field gradient, there is no force in a constant field.

SUMMARY OF THE INVENTION

Accordingly, it is the object of the present invention to provide a novel method and apparatus utilizing magnetic force control for scanning probe microscopy to apply large forces in a contact-mode in applications such as nanolithography or elasticity mapping, and when used in a feedback loop in a non-contact mode, to provide a large "electronic spring constant", and to minimize loss of sensitivity.

Another object of the present invention is to permit feedback to be used to hold the cantilever portion of the probe at a constant deflection throughout the force measurement, permitting the distance between the tip portion of the probe and the sample to be controlled, such as by piezoelectric control.

A further object of the method and apparatus of the present invention is to enable measurement of attractive surface forces down to contact.

Another object of the present invention is to improve non-contact imaging of van der Waals forces at small separations, such as on the order of less than 1 nm, where the force gradient exceeds the cantilever spring constant.

These and other objects are achieved according to the present invention by providing a new improved method and apparatus for magnetic force control for a scanning probe, the method including disposing of a first magnetic source having a magnetic moment on the scanning probe, disposing a second magnetic source external to the scanning probe to apply a magnetic field in a direction other than parallel to the orientation of the magnetic moment from the second magnetic source to the first magnetic source so as to produce a torque acting on the scanning probe related to the amplitude of the magnetic field applied.

Preferably, the magnetic torque is applied by applying a uniform magnetic field perpendicular to the orientation of the magnetic moment. The method of magnetic force control according to the present invention preferably also includes controlling the amplitude of the magnetic field to maintain the deflection of the scanning probe constant during scanning by the scanning probe.

The method of magnetic force control according to the present invention may also include sensing the deflection of the scanning probe as caused by a surface force and applying the magnetic field with an amplitude derived based on the sensed deflection to maintain the deflection of the scanning probe constant. In the method of magnetic force control according to the present invention, it is preferable to apply at least one of a proportional gain and an integral gain to a signal related to the sensed deflection to derive the amplitude of the magnetic field.

In the method of magnetic force control according to the present invention, it is preferable that the scanning probe include a rocking beam balance having a pivot portion and a cantilever portion extending from the pivot portion, and wherein disposing the first magnetic source includes disposing the first magnetic source on the cantilever portion of the rocking beam balance.

In the method of magnetic force control according to the present invention, the scanning probe may also alternatively include a cantilever portion having a fixed end and a free end, and wherein disposing the first magnetic source includes disposing the first magnetic source on the cantilever portion. Disposing the first magnetic source may include disposing a magnetic film having a permanent magnetic moment lying in a direction that is along the cantilever portion.

In the method of magnetic force control according to the present invention, disposing the first magnetic source may include magnetizing the magnetic film after depositing the magnetic film on the cantilever portion to orient the magnetic moment.

The method of magnetic force control according to the present invention additionally may include patterning a magnetic film as the first magnetic source to form a structure lying along the cantilever portion and constraining the magnetic moment of the magnetic film to lie in a direction that is along the structure.

The method of magnetic force control according to the present invention may include disposing a magnet as the first magnetic source on the free end of the cantilever portion, and disposing the magnet to have a magnetic moment that lies in a direction that is along the cantilever portion.

The magnetic force control apparatus for a scanning probe according to the present invention includes a probe provided with a first magnetic source having a magnetic moment, and a second magnetic source for applying an external magnetic field in a direction other than parallel to the orientation of the magnetic moment so as to produce a torque acting on the probe related to the amplitude of the magnetic field applied.

The magnetic force control apparatus according to the present invention may preferably include control means for controlling the amplitude of the magnetic field applied by the second magnetic source to maintain deflection of the probe constant. The control means may include means for sensing the deflection of the probe as caused by a surface force and means for controlling the amplitude of the magnetic field applied to the first magnetic source based on the sensed deflection of the probe. The means for controlling the amplitude may include at least one of a proportional gain and an integral gain in processing a signal related to the sensed deflection of the probe.

In an embodiment of the magnetic force control apparatus of the present invention, the second magnetic source includes an electromagnet and the first magnetic source includes a magnet positioned on the probe.

In another embodiment of the magnetic force control apparatus of the present invention, the second magnetic source includes an electromagnet and the first magnetic source includes a thin magnetic film on the probe.

In the magnetic force control apparatus according to the present invention, the probe preferably may include a rocking beam balance having a pivot portion and a cantilever portion extending from the pivot portion and on which the first magnetic source is disposed.

In another embodiment of the magnetic force control apparatus according to the present invention, the probe may alternatively include a cantilever portion having a fixed end and a free end, and wherein the first magnetic source is provided on the cantilever portion. The first magnetic source may include a magnetic film having a magnetic moment that preferably lies in a direction along the cantilever portion.

In another embodiment of the magnetic force control apparatus of the present invention, the first magnetic source includes a magnet disposed on the free end of the cantilever portion, and the magnet has a magnetic moment that lies in a direction that is along the cantilever portion.

In the magnetic force control apparatus according to the present invention, it is preferable that the magnetic film as the first magnetic source include a material that is a metallic alloy, such as a cobalt-chromium alloy.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A–4C are graphs illustrating results obtained by conventional atomic force microscope method and apparatus and that of the present invention. FIG. 4A is a conventional atomic force microscope force curve displaying cantilever deflection versus sample displacement and in which no magnetic feedback is used. FIGS. 4B and 4C illustrate performance utilizing magnetic force feedback according to the present invention, with FIG. 4B illustrating cantilever deflection and force versus sample displacement, and FIG. 4C illustrating force versus sample displacement.

DESCRIPTION OF THE PREFERRED EMBODIMENTS

Figure 1:
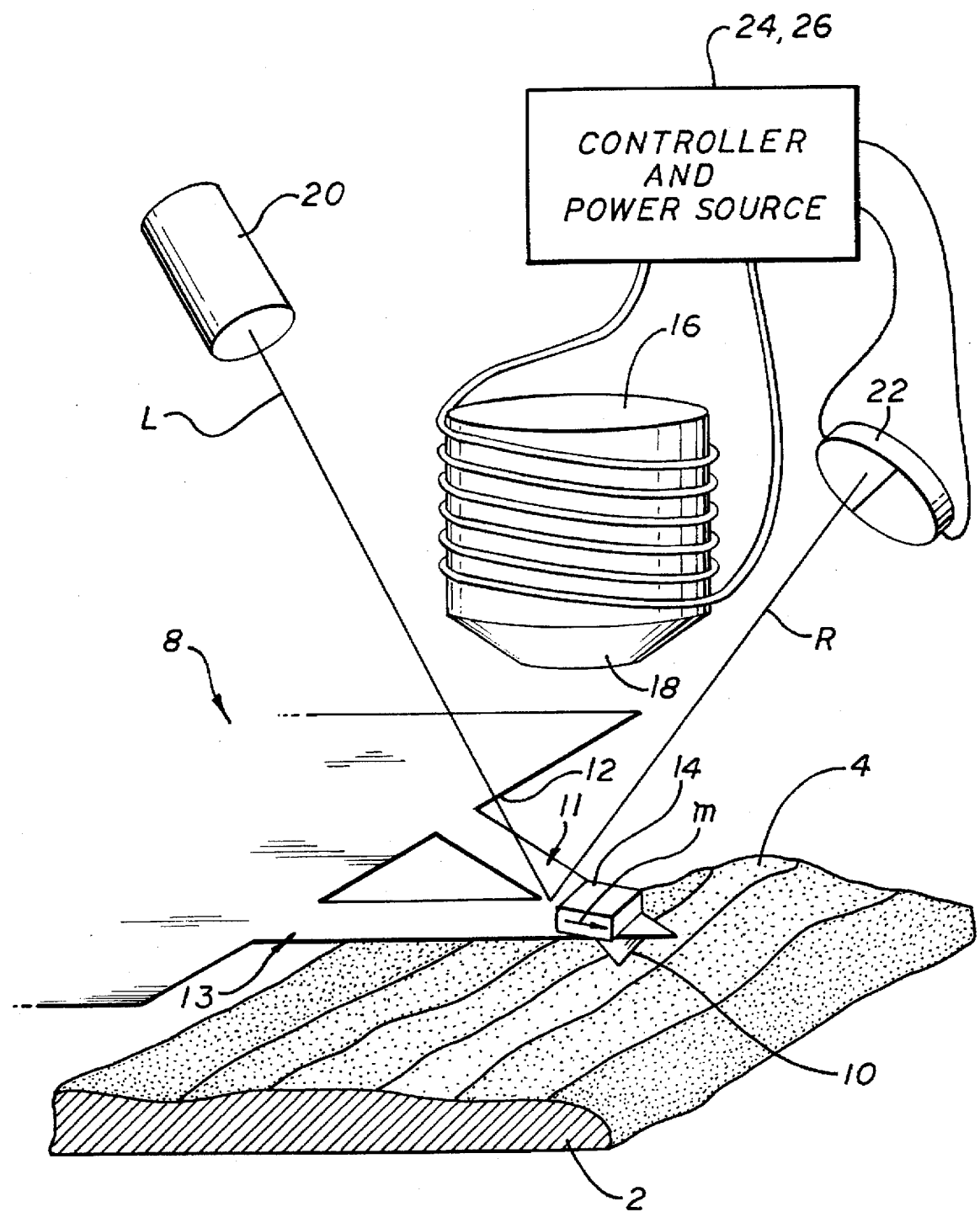
FIG. 1 is a schematic illustration of an embodiment of an apparatus using magnetic force control of the present invention.
Figure 2:
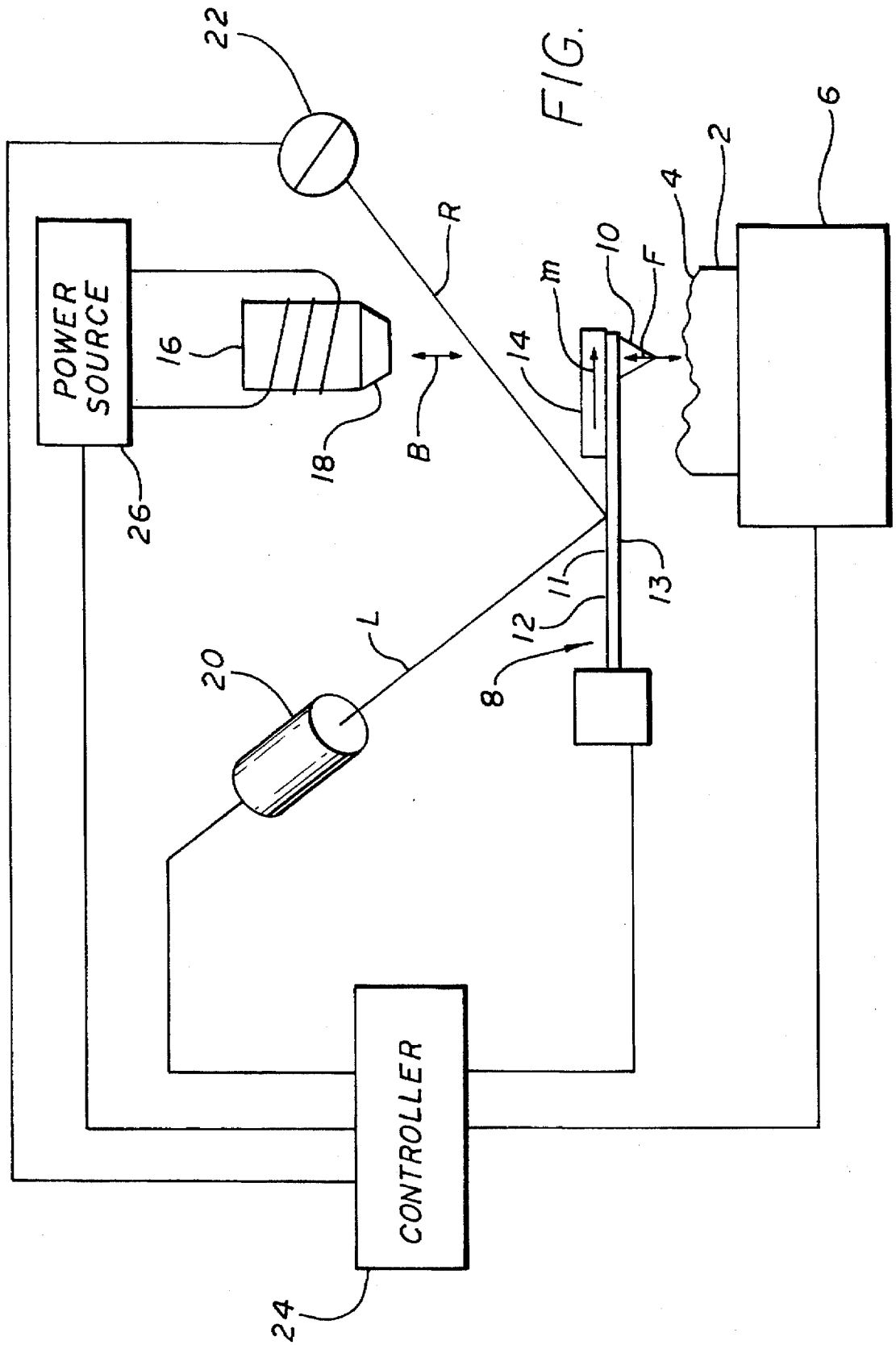
FIG. 2 is a schematic block diagram of an embodiment of a magnetic force control apparatus of the present invention.

Referring now to the drawings, wherein like reference numerals designate identical or corresponding parts throughout the several views, and more particularly to FIGS. 1 and 2 thereof, a sample 2 having a top surface 4 is illustrated. The sample 2 is placed on a sample holder 6. A scanning probe, probe 8, has a tip portion 10 and a cantilever portion 12. A first magnetic source 14 is positioned on the probe 8 in the area of the tip portion 10. The first magnetic source has a magnetic moment m. A second magnetic source 16 having a pole face 18 is positioned external to the probe 8, preferably above the first magnetic source 14, and applies a torque by a magnetic field B to the first magnetic source 14 so as to produce a force on the tip 10 as illustrated in FIG. 2.

The magnetic field B is applied in a direction other than parallel to the orientation of the magnetic moment m of the first magnetic source 14 to produce a magnetic torque acting on the magnetic moment m of the first magnetic source 14 to thereby produce a torque acting on the cantilever portion 12 of the probe 8 related to the amplitude of the magnetic field B applied. It is preferable that the magnetic torque be generated by means of a uniform magnetic field applied in a direction perpendicular to the orientation of the magnetic moment m. It is preferable that the orientation of the magnetic moment m be parallel to the cantilever portion 12 of the probe 8. Referring to FIG. 6B, for example, a force F generated by application of a magnetic field B acting on a magnetic moment m to apply a magnetic torque is illustrated. The torque on the magnetic moment m or dipole D in FIG. 6B results in a force at the end of the magnet of the order $mB_z/l$ where $l$ is the length of the magnet. The force is proportional to the magnetic field B. The force on the same magnet in a magnetic field gradient applied parallel to the magnetic moment would be $$m \frac{\partial B_z}{\partial Z}, \text{ where } \frac{\partial B_z}{\partial Z}$$

is the field gradient in the direction along the magnetic moment. Comparing the expressions for the force generated using a magnetic torque versus a magnetic field gradient, it is seen that the quantity $B_z/l$ plays the role of an effective field gradient. That is, to compare the performance of the two methods, the quantities $$\frac{\partial B_z}{\partial Z}$$

and $B_z/l$ can be directly compared.

Preferably, the first magnetic source 14 includes a small rare earth magnet in a size range of from 10 μm to 100 μm, one example of such size being less than 50 microns, preferably on the back side 11 of the cantilever portion 12, which is affixed thereon by means of epoxy, for example. The magnet may also be affixed to the front side 13, or magnet(s) may be affixed to both the front side 13 and back side 11 of the cantilever portion 12. FIGS. 1, 2, and 3E illustrate the first magnetic source 14 as including a magnet, and as illustrated in these Figures, the magnetic moment m of the magnet preferably lies in a direction that is along the cantilever portion 12 of the probe 8.

Referring to FIGS. 3A, 3B, 3C, 3D, and 3F, the first magnetic source 14 may include a thin magnetic film T which is deposited on the cantilever portion 12 of the probe 8. The magnetic film T is preferably deposited on the back side 11, and may also be deposited on the front side 13, or on both the back side 11 and front side 13 of the cantilever portion 12. The magnetic film T on the cantilever portion 12 may also be used in conjunction with a discrete magnet on the cantilever portion 12 so as to together constitute the first magnetic source 14. For example, a discrete magnet could be positioned on the top of the cantilever portion 12, and a thin magnetic film T on the bottom of the cantilever portion 12. The thin magnetic film T preferably has a thickness in the range of from 10 nm to 100 nm. Also, the magnetic film T is preferably a metallic alloy, such as a chromium-cobalt alloy. The magnetic film may include iron, nickel, and/or cobalt.

While a magnet that is glued to the cantilever portion 12 of probe 8, such as by epoxy, may possibly be more preferable than a magnetic thin film T evaporated or deposited on the cantilever portion 12 of the probe 8, for better reproducibility and mass production, it is desirable to microfabricate the magnet, as the first magnetic source 14, on the back side 11 of the cantilever portion 12 of the probe 8.

There are many possibilities as to ways to microfabricate the first magnetic source 14 on the cantilever portion 12 of the probe 8 using thin magnetic films. In general, a structure with as large a magnetic moment along the length of the cantilever as possible is desired. To this end, the thin film T could be patterned (for example, using photolithographic techniques) as illustrated in FIGS. 3B and 3D, to form a structure ST lying along the cantilever portion 12 of the probe 8 having a long narrow direction along the cantilever portion 12 so that shape anisotropy will constrain the magnetic moment m of the magnetic film T to preferably lie along the cantilever portion 12 in a direction that is along the structure ST. The choice of the magnetic material is also important. Alloys and deposition conditions can be chosen to cause the magnetic moment m to preferably lie in the plane of the magnetic film T, desirably in a direction that is along the cantilever portion 12 of the probe 8. There are many variations of alloys of Cobalt and Chromium with just these properties that have been designed for magnetic recording applications. Referring to FIGS. 3B and 3D, the thin film T could also be magnetized after deposition of the thin film T to cause the magnetic moment m to preferably lie in a direction that is along the cantilever portion 12 and to provide the magnetic poles N and S the magnetic moment m Note that the magnetic moment m could also lie anti-parallel to the direction shown in FIGS. 3B, 3D and 3F.

Referring to FIG. 3D, in the case of a thin film T lying on the cantilever portion 12, the interpretation for how the force is generated differs slightly because one of the poles S of the magnetic moment m is fixed on the substrate at the fixed end 17 and cannot move under the application of a magnetic field. Then the other pole N behaves like a monopole at the free end 19 of the cantilever portion 12 in that it does feel a force in a constant magnetic field.

It is further preferable that the probe 8 include a microfabricated rocking beam balance. The rocking beam balance has the advantage that it can be made weak torsionally so as to have a small spring constant but, on the other hand, the magnet is preferably rigid to provide a more efficient lever arm for the magnetic torque. An example of a rocking beam balance is described in "Rocking beam electrostatic balance for the measurement of small forces" by Miller et al, Rev. Sci. Instrum. 62(3), pages 705–709 (March, 1991).

Figure 3A:
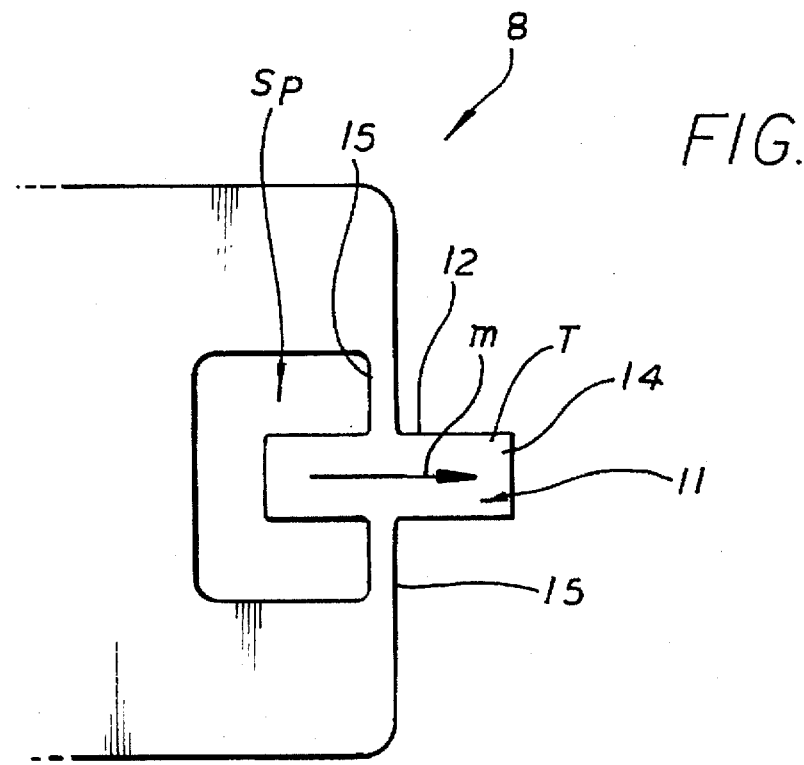
FIGS. 3A and 3B are schematic illustrations of an embodiment of a rocking beam balance for a magnetic force control apparatus of the present invention.
Figure 3B:
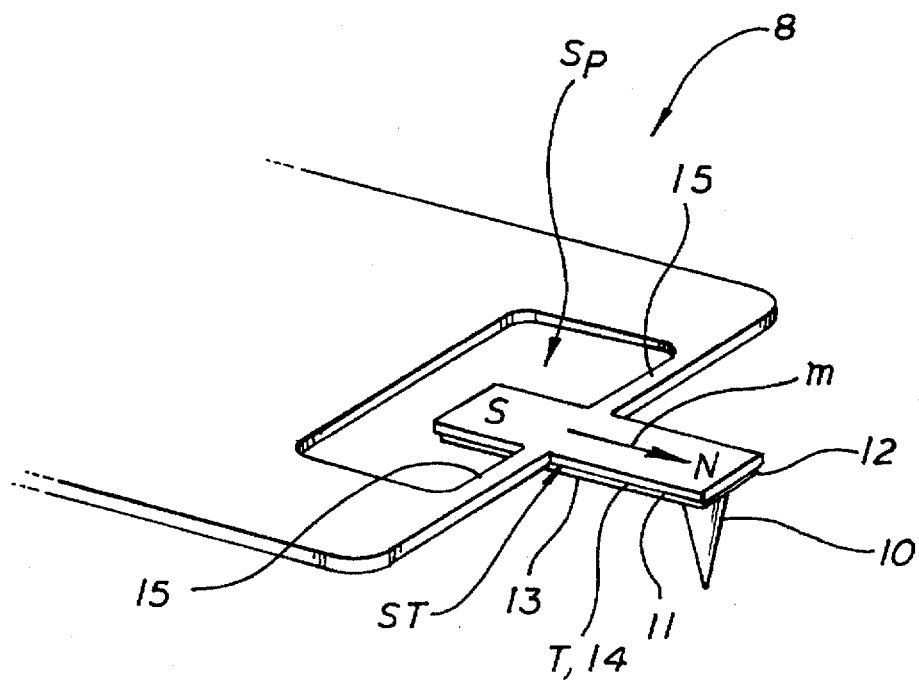
Figure 3C:
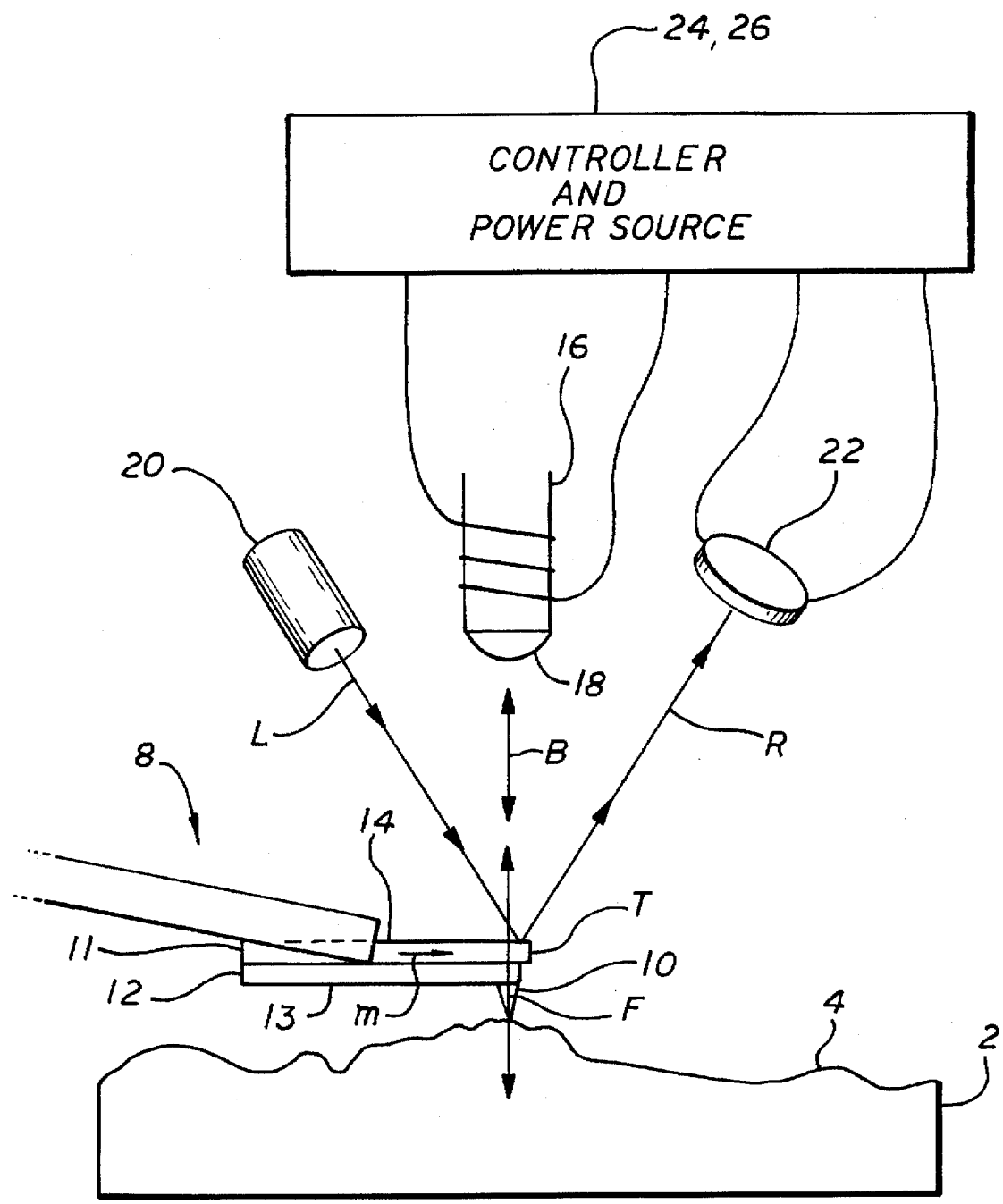
FIG. 3C is a schematic illustration of an embodiment of an apparatus using magnetic force control of the present invention having a rocking beam balance.
Figure 3D:
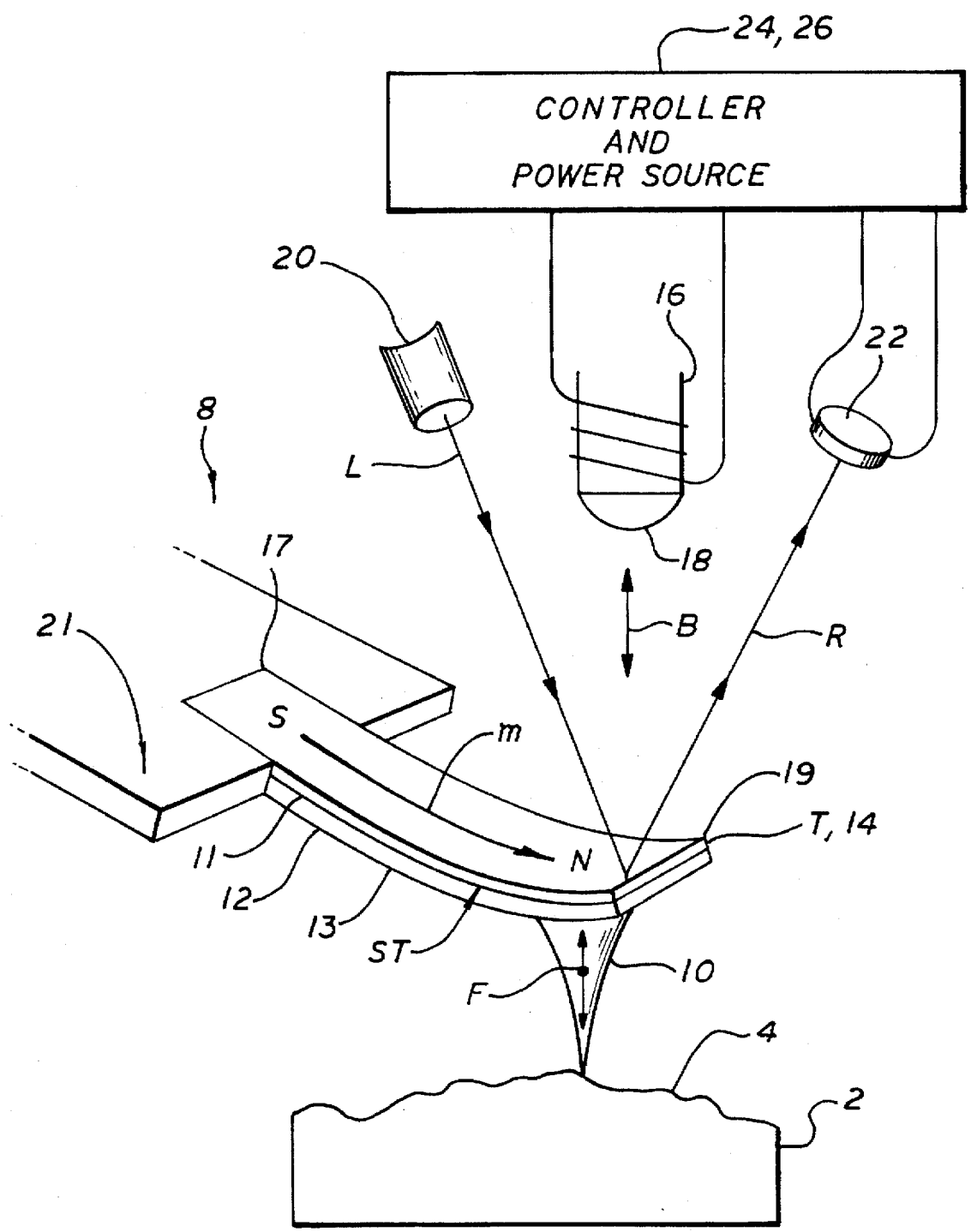
FIG. 3D is a schematic illustration of an embodiment of an apparatus using magnetic force control of the present invention including a probe having a cantilever portion with a fixed end and a free end and having a magnetic film as the first magnetic source.
Figure 3E:
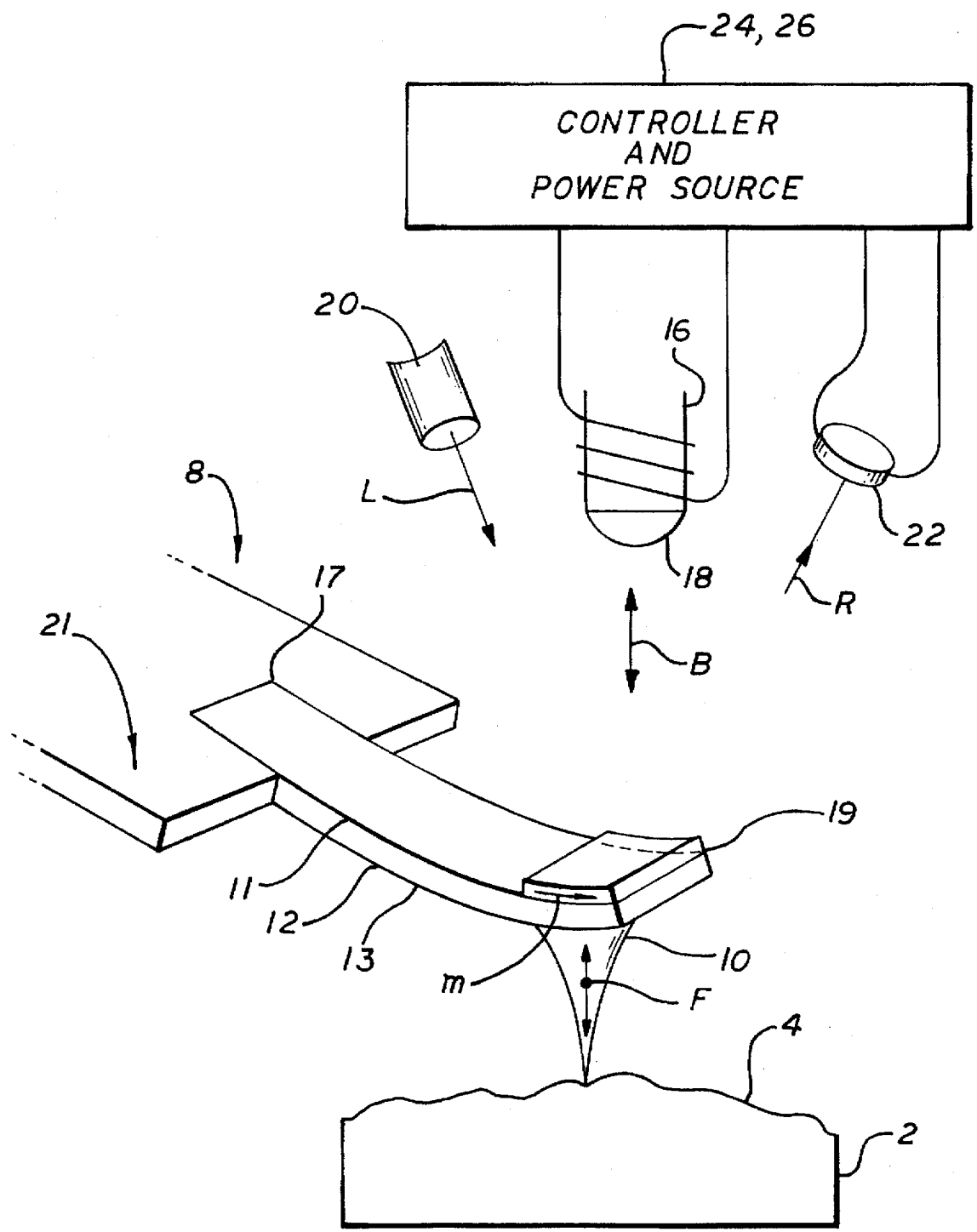
FIG. 3E is a schematic illustration of an embodiment of an apparatus using magnetic force control of the present invention including a probe having a cantilever portion with a fixed end and a free end and having a magnet as the first magnetic source.

An example of a rocking beam balance for use in the present invention schematically is illustrated in FIGS. 3A–3C. Referring to FIGS. 3A and 3B, the rocking beam balance has a probe 8. The probe 8 has a beam portion 12, a pivot portion 15 supporting the beam portion 12, with the beam portion 12 extending from the pivot portion 15, and a tip portion 10. The probe 8, including the beam portion 12 and pivot portion 15, may be microfabricated from silicon or silicon nitride. See, for example, "*Microfabrication of Cantilever Styli for the Atomic Force Microscope*", T. R. Aubrecht, S. Akamine, T. E. Carver, and C. F. Quate, J. Vac. Sci. Technol. A8(4) pg. 3386–3396 (July/August 1990). The first magnetic source 14 includes a thin magnetic film or magnetic coating T that is preferably formed on the back side 11 of beam portion 12. The beam portion 12 supported by the pivot portion 15 is adapted for rocking or pivotal movement about the pivot portion 15 with a portion of the beam portion 12 being able to move in a space Sp formed in the probe 8. The magnetic moment m of the first magnetic source 14 is preferably oriented parallel or anti-parallel to the arrow in FIGS. 3A and 3B.

FIG. 3C schematically illustrates the rocking beam balance of FIGS. 3A and 3B for use in magnetic force control according to the present invention. In FIG. 3C the tip portion 10 of the probe 8 is positioned over the sample surface 4 of sample 2 for scanning the surface 4. The second magnetic source 16 is positioned external to the probe 8, preferably over the beam portion 12, to apply a magnetic field B to the magnetic moment m of the first magnetic source 14.

Also, the probe 8 may include a standard atomic force microscope cantilever modified to include the first magnetic source 14, such standard atomic force microscope cantilever being available from Digital Instruments, Santa Barbara, Calif., (such as a silicon nitride cantilever, part number NP or NP-S, or a silicon cantilever, part number ESP).

Figure 3F:
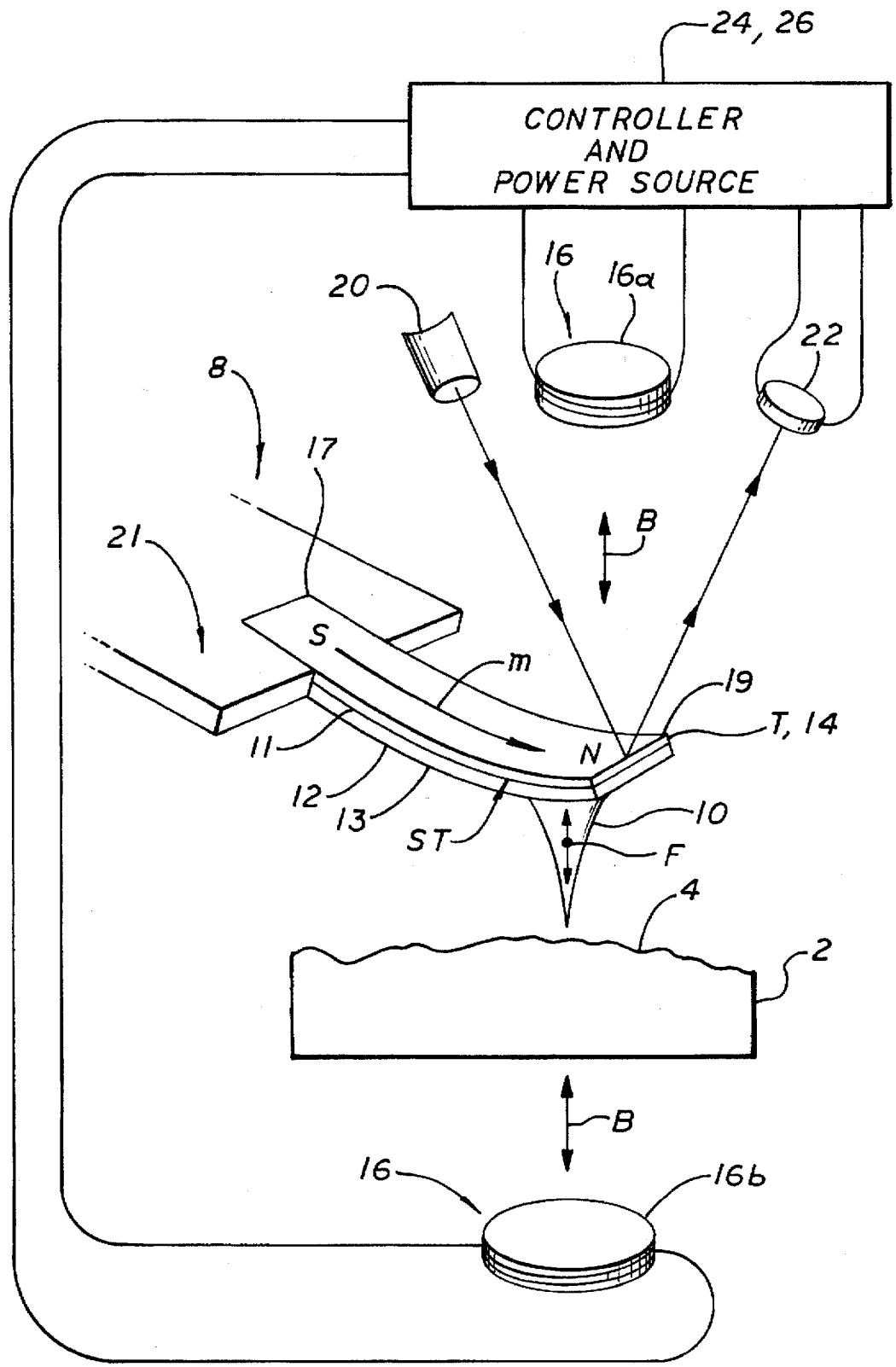
FIG. 3F is a schematic illustration of an embodiment of an apparatus using magnetic force control of the present invention similar to the apparatus illustrated in FIG. 3D, except the second magnetic source is illustrated as including two electromagnetic coils disposed in opposing relation to each other with the cantilever portion of the probe located between the two coils.

Another example of a probe 8 for use in the present invention is schematically illustrated in FIGS. 3D, 3E and 3F. Referring to FIGS. 3D–3F, the probe 8 has a cantilever portion 12 having a back side 11 and a front side 13, and a tip portion 10. The cantilever portion 12 has a fixed end 17 and a free end 19. The fixed end 17 is fixed in a substrate portion 21 of the probe 8. The probe 8, including the cantilever portion 12, may be microfabricated from silicon or silicon nitride similar to the fabrication of the probe 8 including the cantilever portion 12 illustrated in FIGS. 3A–3C.

Referring to FIGS. 3D and 3F, the first magnetic source 14 includes a thin magnetic film or magnetic coating T that is preferably formed on the back side 11 of the cantilever portion 12. The materials and formation of the magnetic film T are similar to those previously discussed herein, the magnetic film T preferably being a magnetic alloy, such as a cobalt-chromium alloy. The magnetic film T has one magnetic pole S at the fixed end 17 and another magnetic pole N at the free end 19 of the cantilever portion 12. In the embodiment illustrated in FIGS. 3D–3F, the fixed end 17 does not move under the application of a magnetic field while the free end 19 is adapted for movement under the application of a magnetic field. A magnetic moment m of the first magnetic source 14 is preferably oriented parallel or anti-parallel to the arrow in FIGS. 3D and 3F, and the magnetic moment m would preferably lie in a direction that is along the cantilever portion 12 of the probe 8.

FIG. 3E is similar to FIG. 3D with the difference that the first magnetic source 14 in FIG. 3E includes a magnet, such as a rare earth magnet, positioned on the free end 19 of the cantilever portion 12. Similar to FIG. 3D, the free end 19 in FIG. 3E is adapted to move under the application of a magnetic field while the fixed end 17 does not move under the application of a magnetic field.

FIGS. 3D–3F schematically illustrate a probe 8 having a cantilever portion 12 with a fixed end 17 and a free end 19 for use in magnetic force control according to the present invention. In FIGS. 3D–3F, the tip portion 10 of the probe 8 is positioned over the sample surface 4 of sample 2 for scanning the surface 4. The second magnetic source 16 is positioned external to the probe 8, preferably over the cantilever portion 12 as illustrated in FIGS. 3D and 3E, to apply a magnetic field B to a magnetic moment m of the first magnetic source 14. In FIG. 3F the second magnetic source 16 includes electromagnetic coils 16a and 16b positioned external to the probe 8 with the cantilever portion 12 of the probe 8 positioned between the electromagnetic coils 16a and 16b to apply the magnetic field B to a magnetic moment m of the first magnetic source 14.

It is preferable that the magnetic moment m of the first magnetic source 14 be oriented along the length of the cantilever portion 12 as illustrated by the arrow in FIGS. 1, 2, 3A–3F. In one embodiment implemented according to the invention, the second magnetic source 16 includes an electromagnet having a pole face 18 in the size range of from 1 mm to 2 cm, positioned in a range of from 100 µm to 2 cm, from and preferably above the cantilever portion 12 of probe 8, one example being a pole face 18 of 5 mm positioned 1 cm above the cantilever portion 12, to provide a magnetic field perpendicular to the orientation of the magnetic moment m, the magnetic field being fairly uniform on the length scale of the first magnetic source 14, such as the magnet or the thin magnetic film T, on the cantilever portion 12.

Referring to FIGS. 1, 2 and 3C–3F, a means for measuring the deflection of the probe 8 during the measurement of a surface force is illustrated. For example, a light source 20, such as a laser diode, emits a light beam L. The light beam L is reflected off the cantilever portion 12 of the probe 8 and the reflected beam R is detected by a detector 22, such as a segmented photodiode.

Controller 24 as illustrated functions to control relative movement between the probe 8 and sample 2 during scanning in a conventional manner such as in scanning probe microscopy, for example. Controller 24 also functions in the control of the application of the magnetic field B from the second magnetic source 16 to the first magnetic source 14 in the present invention. The controller 24 illustrated in FIGS. 1, 2 and 3C–3F, typically is a computer controlling various functions during measurement of a surface force or during movement of the probe 8 on or over a surface. The controller 24 also receives and processes data received during such measurement of a surface force or during such movement of the probe 8, such as data on the measurement of or sensing of the deflection of the probe 8. The controller 24 is typically a computer that includes the requisite logic and circuitry to accomplish such control, data storage, and data processing.

In operation, for example, the controller 24 typically provides a signal to the light source 20 to generate the light beam L to be reflected off the surface of the cantilever portion 12 of the probe 8. A signal related to the reflected beam R sensed by the detector 22 is provided to the controller 24. The controller 24 typically includes an analog-to-digital converter, for example, for converting an analog signal from the detector 22 into a digital signal; and a programmed digital computer for receiving the digital signal from the analog-to-digital converter and calculating an appropriate output or outputs, as disclosed, for example, in U.S. Reissue Pat. No. RE 34,331. The controller 24 executes proportional gain, integral gain or differential gain processing steps, or a combination thereof, to produce an output signal related to the sensed deflection from the detector 22, to derive an amplitude of the magnetic field B to be applied.

Each form of gain (proportional, integral, differential) produces an output signal related to the sensed deflection to keep the cantilever at a desired deflection. More accurately, the gains produce an output signal related to the error signal. The error signal is the difference between the deflection signal and some desired deflection (known as the setpoint) and is a measure of how far away the cantilever is from the desired deflection. Proportional gain produces a signal directly proportional to the error signal, while integral gain produces a signal proportional to the integral with respect to time of the error signal, and differential gain produces a signal proportional to the time derivative of the error signal. Two or all three of these gain signals can be added together to produce an output signal to be supplied to the electromagnet. It has been found that integral gain with a small amount of proportional gain is particularly useful.

The controller 24 typically controls a power source 26, such as a current source, to control the current supplied to the second magnetic source 16 which then applies the magnetic field B to the first magnetic source 14. This results in a torque on the first magnetic source 14, and in turn a force F at the tip 10. The power source 26 may be combined with the controller 24 as schematically illustrated in FIGS. 1 and 3C–3F. The controller 24 controls the power source 26 to supply current of a magnitude so that the amplitude of the magnetic field B and, therefore, the resultant force F, is applied in relation to the surface force acting on the probe 8, such as in a proportional relation thereto when using proportional gain processing, for example. Therefore, the current supplied, the amplitude of the magnetic field B applied, and the resultant force F applied may vary with time, depending on the surface force acting on the probe 8. It is further preferable that the magnetic field B generated by the second magnetic source 16 be a uniform magnetic field oriented perpendicular to the orientation of the magnetic moment m of the first magnetic source 14. Such a field could also be produced by placing the cantilever at the center of a pair of electromagnetic coils 16a, 16b illustrated in FIG. 3F, such as a pair of Helmholtz coils, for example.

Therefore, with the method and apparatus of the present invention, a magnetic field B is applied by the second magnetic source 16 to act on the magnetic moment m of the first magnetic source 14 to maintain deflection of the cantilever portion 12 of the probe 8 constant, such as during non-contact imaging as the probe 8 and the sample 2 are moved relative to each other or, in particular, during the measurement of surface forces, as in FIG. 4. The size of the first magnetic source, the amplitude of the magnetic field B and the amplitude of the force F generated depend upon the particular use and application. However, typically forces on the order of 2 to 500 nN can be generated with an electromagnet and a small magnet on the cantilever portion of the probe in atomic force microscope applications of the invention.

The strength of the field generated second magnetic source typically will be in the range of 0.01 T to 0.1 T, and the strength of the magnetic moment of the first magnetic source will typically be in the range of $10^{-4}$ EMU to $10^{-6}$ EMU. For example, in atomic force microscopy applications, the magnetic field B generated may be 0.01 T(100 G) 2 mm from the pole face of the electromagnet.

When a current is supplied from the power source 26, such as a current source, to the second magnetic source 16, such as an electromagnet, the magnetic moment of the first magnetic source 14 experiences a magnetic torque that tends to align it with the field. A reversal of the electromagnetic current reverses the field and therefore the torque. If the tip portion 10 of the probe 8 is not in contact with the surface 4 of the sample 2, such as during force measurements or non-contact imaging, and a surface force is acting on the tip portion 10, a torque is applied on the cantilever portion 12 of the probe 8. This torque can be cancelled magnetically using a feedback loop to detect the cantilever deflection. This is schematically indicated in FIGS. 1, 2 AND 3C–3F by the reflected beam R, detected by the detector 22 providing a signal to the controller 24 which controls the power source 26 to supply the appropriate current to the second magnetic source 16 to apply the magnetic field B to the cantilever portion 12 of the probe 8 to produce a torque to magnetically cancel this torque. The amplitude of the magnetic field B therefore can vary. Therefore, the application of the magnetic field B and the resultant force F so applied maintains the deflection of the cantilever portion 12 of the probe 8 constant, and the current supplied to the second magnetic source 16 to keep it so is proportional to the surface force acting on the probe 8 at the tip portion 10. Thus, with the present invention, the current to the second magnetic source 16 required to maintain the deflection of the probe constant is a direct measure of the surface force acting on the probe tip portion 10.

The force sensitivity may be determined by the spring constant of the cantilever portion 12 of the probe 8 and the sensitivity of the position detector, such as detector 22. However, in the method and apparatus of the present invention, the cantilever may act with an effective "electronic spring constant" which can be significantly larger than that of the cantilever portion 12 of the probe 8. If the tip portion 10 of the probe 8 is in contact with the surface 4 of the sample 2, the magnetic torque can supply a force on the tip portion 10 through a lever arm along the cantilever portion 12, and may therefore be used to generate large forces on the sample 2 for nonolithography or elasticity measurements, for example.

Figure 4B:
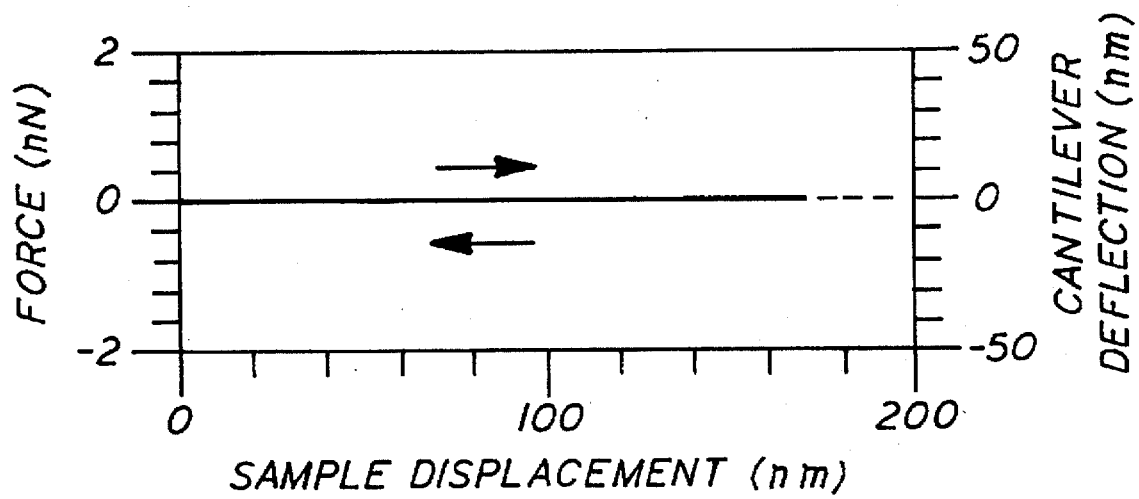
Figure 4C:
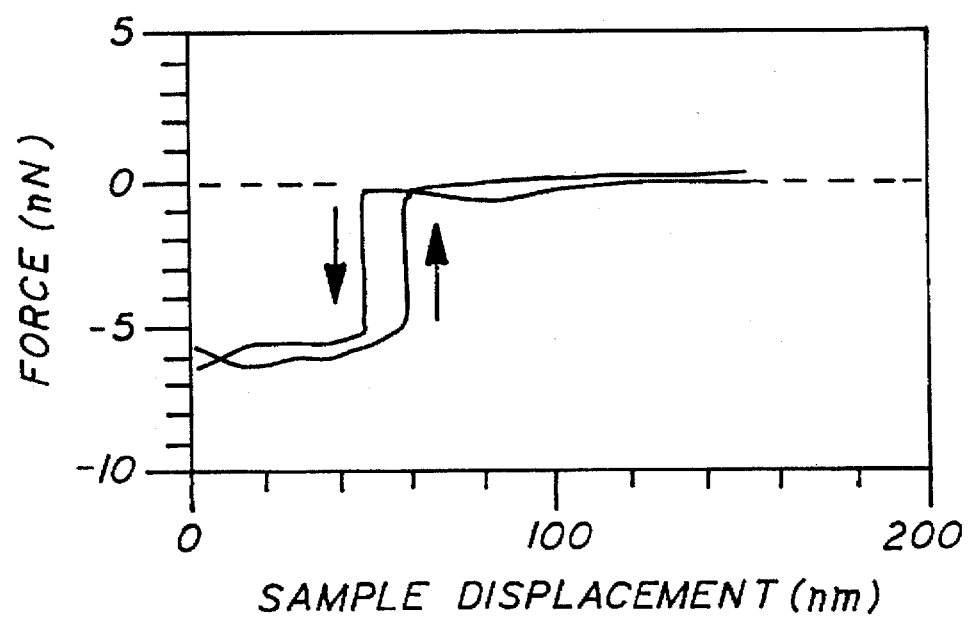
Figure 5A:
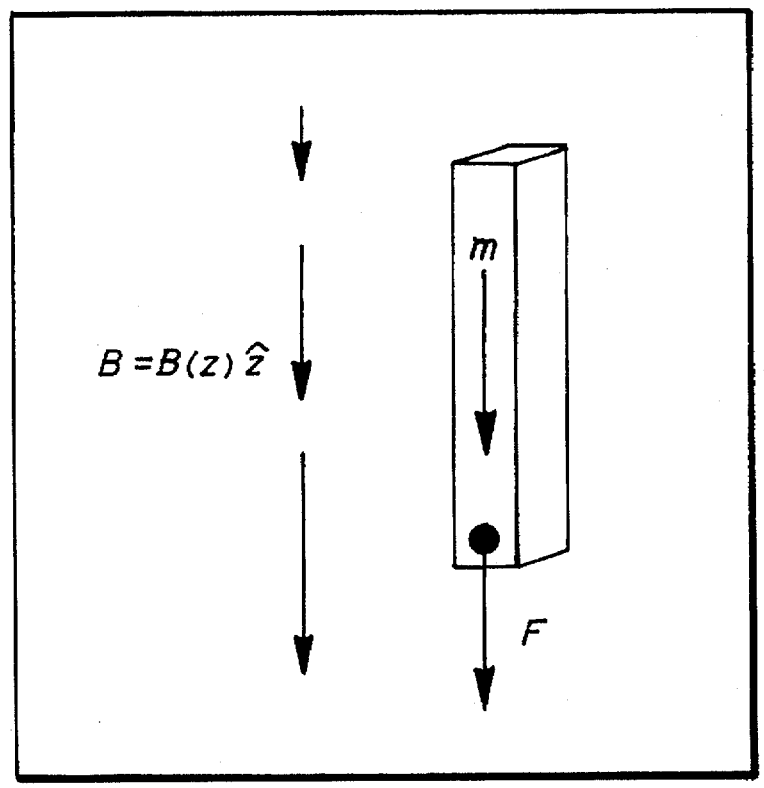
FIG. 5A is a schematic illustration of a known application of a force with a magnetic field gradient.
Figure 5B:
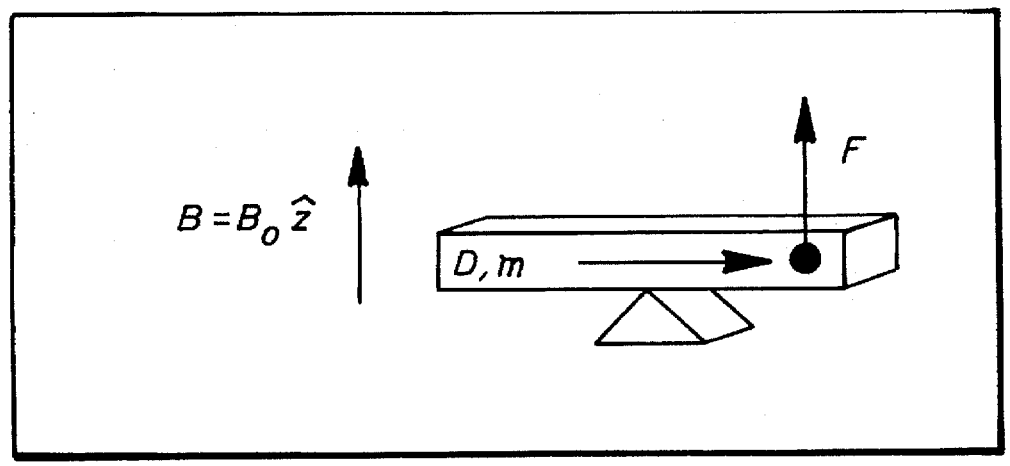
FIG. 5B is a schematic illustration of generating a force by a magnetic torque generated by application of a magnetic field as in the present invention.

FIGS. 4B and 4C illustrate the performance of the magnetic force control of the present invention in comparison with the conventional control shown in FIG. 4A. These figures illustrate the results of force measurement between a silicon nitride tip and a piece of silicon nitride wafer in water (>18MΩ) with and without magnetic force feedback.

All measurements were performed using a Nanoscope II AFM (atomic force microscope), supplied by Digital Instruments, Inc., utilizing optical lever detection with a standard fluid cell. Triangular silicon nitride cantilevers 200 μm in length (the altitude as measured from the base portion of the triangular cantilever) with 36 μm wide legs were modified by attaching a small permanent magnet to the backside of the cantilever. The magnets were made by grinding a large SmCo magnet and collecting magnetic shards from the particle stream using a permanent magnet behind a glass coverslip. The magnets were then removed from the coverslip using glass micropipettes and a three-way micropositioner. A separate micropipette and positioner were used to place a small drop of epoxy on the backside of the cantilever. After allowing the epoxy to cure for ten to fifteen minutes, the magnet could be transferred from the micropipette to the free end on the cantilever. This entire operation was performed in the presence of a magnetic field so that the orientation of the magnet could be controlled. The moment of the magnet was oriented along the length of the cantilever.

The spring constant of the cantilever was estimated by measuring the resonant frequency of the cantilever before the magnet was attached. The cantilevers used were all from one location in a single wafer and had spring constants of 40±10 pN/nm. The cantilever could then be used as a nanogram balance and measurement of the resonant frequency after attaching the magnet gave a value for the mass of the magnet and epoxy. This was typically 30 to 200 ng. corresponding to a cube with sides 16 to 30 μm. The magnets were fairly thin (e.g., 40×40×10 μm) and were positioned flat on the cantilever.

A solenoid with a magnetic core was used to apply a force on the cantilever. The core was a piece of Permendur (a high permeability, low coercivity alloy) with rectangular cross-section about 3 by 4 by 25 mm with a ground pole tip to focus the field and provide optical clearance. About 200 turns of #30 copper magnet wire were wound on the core giving the electromagnet a resistance of 4Ω and an inductance of 500 μH at 1 kHz. The coil was driven by a power amplifier current limited to 1 A. A 100Ω power resistor was added in series to the coil to increase the frequency response of the coil. The electromagnet was mounted on a three way micropositioner so that it could be positioned accurately above the cantilever without blocking the laser beam used for position detection.

Balance between the tip-sample force and magnetic force was achieved by feeding the cantilever deflection signal into a feedback amplifier which drove the electromagnet through a current amplifier. Although both proportional and integral gain were used, integral gain was typically more important. Any changes in the force applied to the tip by the sample were balanced by the magnetic torque which maintained a cantilever deflection corresponding to the set point of the feedback amplifier.

The voltage to the z piezo was produced using a function generator and a high voltage amplifier. Both the output from the feedback amplifier and the deflection signal from the microscope could be displayed against the z voltage on a storage oscilloscope. The data was digitized and transferred to a computer for display.

The force generated by the electromagnet was calculated by recording the cantilever deflection for a given current and then multiplying by the cantilever spring constant. The cantilever deflection calibration (V/nm) was measured from the slope of the constant compliance (contact region) of a force curve on mica. Depending on the size and properties of the permanent magnet, maximum forces from 2 to 500 nN could be applied to the tip of the cantilever.

FIG. 4A is a standard atomic force microscope force curve displaying cantilever deflection versus sample position or displacement without magnetic force feedback measured between a silicon nitride tip and a silicon nitride wafer in water in the presence of a contamination layer. Magnetic force control according to the present invention was not utilized in obtaining the data in FIG. 4A. Referring to the curve illustrated in FIG. 4A, there was noted a very slight repulsion (approximately 100 pN) and then an instability occurred and the cantilever snapped to the surface from about 60 nm at point 1, where wetting forces caused cantilever instability at this tip-sample separation. When the load was increased with the tip in contact with the surface, a large repulsive force due to contact with the surface was experienced from 60 nm to 0 nm. Upon decreasing the load, the cantilever adhered to the surface and then pulled away from the surface about 20 nm before experiencing another instability at point 2. The cantilever jumped from point 2 to a position about 65 nm above the surface at point 3 where it slowed, and then finally jumped to the zero force line.

The force curve in FIG. 4A illustrates a wetting force due to a contamination layer on the sample. Any calculation of attractive van der Waals forces between the tip and the sample predicts cantilever instabilities at distances less than 5 nm even for big tips (R=100 nm), large Hamaker constants ($A=10^{-19}$ J), and weak cantilevers (k=50 pN/nm). The slight repulsion noted before the instability also evidenced the presence of a contamination layer. Interfaces between two liquids are often charged, so double-layer forces are expected. Finally, the fact that the cantilever did not jump cleanly from the surface at point 2 and then slowed at point 3 in FIG. 4A is consistent with a wetting force. Wetting of the sides of the tip as it withdraws from the surface could account for the flat lift-off at point 2 and a meniscus drawn into the water could account for the slowing of the lever at point 3.

FIGS. 4B and 4C show the performance of magnetic force control of the present invention utilizing magnetic force feedback for force measurement between a silicon nitride tip and a silicon nitride wafer in water in the presence of a contamination layer. FIG. 4B shows the deflection signal recorded while the feedback was running (the error signal). The cantilever deflection was maintained constant to within 2 nm (80 pN) up to contact. Therefore, this evidenced that the feedback was balancing the forces applied to the cantilever. FIG. 4C is related to the current supplied to the electromagnet to maintain the constant cantilever deflection. Data is only shown up to the point of contact. The feedback did not maintain constant cantilever deflection long after the tip came into contact with the surface because doing so would have resulted in applying relatively large forces likely to deform the tip and the surface. Therefore, the power amplifier was current limited to a value corresponding to a few nanoNewtons of repulsive force but was not current limited in the attractive force direction.

Since the cantilever was held at a constant separation throughout the measurement, FIG. 4C can be interpreted as a true force versus tip-sample separation curve. Because the cantilever deflection was maintained constant throughout the measurement, the horizontal axis can also be read as tip-sample separation. The data in FIG. 4C shows the sudden onset of an attractive force at about the same tip-sample separation at which the instability occurred in FIG. 4A. A lower limit of about 3 nN/nm can be placed on the maximum attractive force gradient. Since the cantilever used had a spring constant about 60 times smaller, this is consistent with the fact that an instability was observed in FIG. 4A.

FIGS. 4A–4C demonstrate the use of magnetic force control of the present invention to measure a wetting force in a regime that is mechanically unstable without feedback. Thin films commonly absorb to surfaces in both liquid and air, and can produce forces when in contact with the tip. These types of layers are often present and can make imaging difficult or impossible because they apply an uncontrollable loading force to the tip which can be much larger than the smallest tracking forces that can be applied (<10 pN). Magnetic force control of the present invention using force feedback can be used to offset these detrimental forces during imaging. Since ferromagnetic materials are much less common than dielectric materials, use of magnetic forces extends the applicability of feedback control. Many materials used in atomic force microscope construction are not ferromagnetic (e.g. piezos, glass, aluminum and stainless steel) so they can come between the cantilever and magnetic field source without affecting the field. Also, most liquids have a magnetic permeability of essentially unity and are therefore invisible to magnetic fields. Thus, the presence of liquids does not interfere with applying a magnetic force on the cantilever.

Magnetic force control according to the present invention is advantageous in that magnetic forces can be used to modulate tip-sample forces in atomic force microscopy. In practice, forces on the order of 2–500 nN can be generated with an electromagnet and a small magnet on the cantilever. The external magnetic force can be used to balance tip-sample interactions while measuring force versus distance curves or imaging, allowing mapping of forces in regions otherwise inaccessible. It can also be used to apply additional forces for applications such as elasticity mapping. The present invention has applicability for use in fluids such as gases or liquids.

The method and apparatus of magnetic force control of the present invention offers several advantages over known methods. The use of magnetic force typically offers advantages over use of electrostatic forces in atomic force microscopy. Also, as mentioned previously, the ability to work in fluids is enhanced when using an atomic force microscope in that images on many types of samples are improved. Since fluids have dielectric constants, the change in capacitance as well as hydrodynamic forces between the plates may cause problems using capacitive techniques in fluid. Further, electric fields are affected by the presence of most insulating or conducting material. This may create difficulties in that the source of the field (the capacitor plate not attached to the cantilever) may be close to the cantilever, and typically an intervening medium, such as a fluid, between the field source and the cantilever will affect the field. On the other hand, most materials are invisible to magnetic fields. As such, utilization of the apparatus and method for magnetic force control of the present invention permits the source of the magnetic field, such as the second magnetic source or electromagnet, to be large and positioned sufficiently remote from the cantilever without regard to many types of materials (for example outside a glass fluid cell).

In contrast to the use of magnetic field gradients, advantages specific to using a magnetic torque are realized. First, the geometry of the torque method is better suited for application to atomic force microscopy than that of the field gradient method. In that magnetization tends to lie along the geometrically thin direction of materials, such as in the plane of thin films, it is generally easier to orient the magnetic moment along the cantilever by gluing a magnet flat or evaporating a thin magnetic film than it is to orient the moment perpendicular to the cantilever.

Also, larger forces may be generated using the torque method. In the field gradient method, a gradient on the length scale of a permanent magnet must be created to apply appreciable forces to the magnet. Typically, the size of the scanning probe, which generally is on the order of one hundred microns, dictates the size of the magnet. As such, technical problems may result through the creation of huge field gradients. Conversely, it is relatively easier to create a field nearly constant on the length scale of the magnet by simply using an electromagnet with dimensions large compared to the probe size. Considering the limits of the magnet size and on field gradients that can be currently achieved, the torque method promotes easier implementation and promotes the generation of much larger forces.

For example, in experimentation using the method and apparatus for magnetic force control of the present invention, the electromagnet produced a field of about 0.01 T (100 G) 2 mm from a smooth pole face and a field gradient of 3 T/m (300 G/cm) the same distance from a sharp pole. Since the cantilever magnet used was about 40 µm long, an effective field gradient of 250 T/m was produced, about 80 times larger than the real field gradient. Thus, larger forces could be applied for magnets with their magnetic moments parallel to the cantilever using the present invention.

Not only does the method and apparatus of the present invention using a magnetic torque give larger effective gradients over known field gradient methods, it is also much easier to implement. The highest field gradients are created very near a sharp magnet pole, but it is difficult to bring a sharp pole close to the cantilever from above without blocking the light path for sensing cantilever deflection. If the pole is underneath the sample there is a limit on sample thickness. On the other hand, it is easy to create a fairly constant field at the cantilever with the pole face spaced many millimeters from the sample. Also, if a thin magnetic film is used (either a magnetically hard or soft film) it is easier to get the magnetization to lie in the plane of the film (cantilever). In experimentation using the present invention with evaporated iron, nickel and cobalt coatings, forces were generated as high as 10 nN. However, the magnetic properties of the films were highly variable. With better techniques, thin films could be a viable way to mass produce cantilevers suitable for magnetic force control using the present invention.

A further advantage of the present invention using a magnetic torque is that it scales to smaller size more favorably. Since the moment of an object scales roughly with the volume (assuming constant magnetization), if δ represents the length scale of the magnet, the force generated by a gradient scales on the order of $δ^3$, whereas the force generated by a torque scales on the order of $δ^2$. The result can be understood qualitatively. As the moment becomes smaller, it becomes more difficult to create a gradient on its length scale, whereas maintaining a constant field on its length scale becomes easier.

An advantage of the method and apparatus of the present invention is that a weak cantilever may be used to provide good force resolution while preventing snap-down until the gradient exceeds the "electronic spring constant" of the feedback loop.

Additional advantages of the method and apparatus of the present invention lie in the existing imaging modes of the atomic force microscope. Resolution in the contact-mode depends on the sharpness and the aspect ratio of the tip of the probe. As the sharpness and the aspect ratio are increased, the tip of the probe typically becomes more fragile. The method and apparatus utilizing magnetic force control of the present invention promotes preventing the snap-down when engaging delicate tips for contact imaging.

The method and apparatus of the present invention also has applicability as to existing non-contact microscopes using interferometers. In obtaining a linear response from an interferometer, it is known that the length of the optical path must be set to a specified distance. Utilizing the present invention, rather than physically moving a fiber optic cable or laser diode, magnetic force control of the present invention would be used to control the deflection of the cantilever portion of the probe.

Further, applicability of the present invention lies in the field of nanolithography. With the method and apparatus utilizing the magnetic force control of the present invention, large forces can be applied to the cantilever portion of the probe while in contact with a surface of a sample to remove photoresist or physically pattern the sample, for example. When such large force is discontinued, the cantilever portion of the probe is then used to image the pattern at a low force.

The present invention is also applicable to the use of the atomic force microscope to dissect biological membranes. The method and apparatus utilizing magnetic force control of the present invention promotes achieving higher dissection forces without sacrificing the ability to image at low forces which are usually required with biological samples.

A further advantage of the present invention relates to non-contact imaging of van de Waals forces at small separations, such as on the order of less than 1 nm, by allowing non-contact resolution close to that of the current contact modes and promotes eliminating destructive tracking and associated frictional forces.

As to an elasticity microscope, the present invention promotes the ability to image at low force using a conventional contact mode to determine topography and then image with a large imaging force applied magnetically, whereby differences between the two images provides information on local elasticity.

The ability to apply a large force directly to the end of the cantilever is useful in various applications. It is particularly useful in elasticity mapping because applying a loading force by bending the cantilever also causes the tip to slide relative to the sample, convoluting elasticity and friction information. Applying the force magnetically at the end of the cantilever using magnetic force control of the present invention promotes circumventing this problem.

Additionally, the ability to apply forces directly to the cantilever (through any means) can be used not only to increase the effective stiffness of the cantilever, but also to change other dynamical properties such as the effective resonant frequency or quality factor (Q). Magnetic force control according to the present invention in this regard may be advantageous.

Obviously, additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of magnetic force control for a scanning probe, comprising the steps of:
   disposing a first magnetic source on said scanning probe, said first magnetic source having a magnetic moment along a first predetermined direction;
   disposing a second magnetic source external to said scanning probe to apply a magnetic field from said second magnetic source to said first magnetic source in a direction substantially perpendicular to said first direction so as to produce a torque acting on said scanning probe related to the amplitude of the applied magnetic field.

2. The method of claim 1, further comprising the steps of:
   controlling the amplitude of said magnetic field to maintain the deflection of said scanning probe constant during scanning by said scanning probe.

3. The method of claim 2, wherein said controlling step comprises:
   sensing the deflection of said scanning probe as caused by a surface force during said scanning; and
   applying said magnetic field with an amplitude derived based on the sensed deflection.

4. The method of claim 3, wherein said scanning probe comprises a rocking beam balance having a pivot portion and a cantilever portion extending from said pivot portion, and wherein disposing said first magnetic source comprises disposing said first magnetic source on said cantilever portion.

5. The method of claim 3, wherein said scanning probe comprises a cantilever portion having a fixed end and a free end, and wherein disposing said first magnetic source comprises disposing said first magnetic source on said cantilever portion.

6. The method of claim 3, wherein the step of disposing said second magnetic source comprises applying a uniform magnetic field perpendicular to said orientation of said magnetic moment.

7. The method of claim 6, wherein the step of disposing said first magnetic source comprises orienting said magnetic dipole in a direction parallel to said scanning probe.

8. The method of claim 1, wherein said step of disposing said second magnetic source comprises applying a uniform magnetic field perpendicular to said orientation of said magnetic moment.

9. The method of claim 1, wherein the step of disposing said first magnetic source comprises orienting said magnetic moment in a direction parallel to said scanning probe.

10. The method of claim 1, wherein said scanning probe comprises a rocking beam balance having a pivot portion and a cantilever portion extending from said pivot portion, and wherein disposing said first magnetic source comprises disposing said first magnetic source on said cantilever portion.

11. The method of claim 10, wherein disposing said first magnetic source comprises disposing a magnet on said cantilever portion.

12. The method of claim 10, wherein disposing said first magnetic source comprises disposing a magnetic film on said cantilever portion.

13. The method of claim 1, wherein said scanning probe comprises a cantilever portion having a fixed end and a free end, and wherein disposing said first magnetic source comprises disposing said first magnetic source on said cantilever portion.

14. The method of claim 13, wherein disposing said first magnetic source comprises disposing a magnet on said free end of said cantilever portion.

15. The method of claim 13, wherein disposing said first magnetic source comprises disposing a magnetic film on said cantilever portion.

16. The method of any one of claims 10, 11, 12, 13, 14 or 15, wherein disposing said first magnetic source comprises disposing said first magnetic source to have a magnetic moment that lies in a direction that is along said cantilever portion.

17. The method of any one of claims 10 or 13, wherein disposing said first magnetic source comprises magnetizing a magnetic film after depositing said magnetic film on said cantilever portion to provide the orientation of the magnetic moment of said magnetic film.

18. The method of any one of claims 10 or 13, wherein disposing said first magnetic source comprises patterning a magnetic film to form a structure that lies along said cantilever portion and constraining the magnetic moment of said magnetic film to lie in a direction along said structure.

19. The method of claim 1, further comprising the step of:
contacting a surface with a tip portion of said scanning probe during scanning by said scanning probe.

20. The method of claim 1, further comprising the step of:
maintaining a tip portion of said scanning probe in spaced relation to a surface to be scanned during scanning by said scanning probe.

21. The method of any one of claims 1, 2, 3, 4, 5, 6, 7, 8, 9, 10, or 13, further comprising the step of:
producing an output signal related to the amplitude of said magnetic field applied by said second magnetic source indicative of a surface force applied to said scanning probe.

22. A magnetic force control apparatus for a scanning probe, comprising:
a probe provided with a first magnetic source having a magnetic moment along a first predetermined direction; and
a second magnetic source disposed external to said probe to apply a magnetic field to said first magnetic source in a second direction substantially perpendicular to said first direction so as to produce a torque acting on said probe related to the amplitude of the applied magnetic field.

23. The magnetic force control apparatus as set forth in claim 22, further comprising:
control means for controlling the amplitude of said magnetic field applied by said second magnetic source to maintain deflection of said probe constant.

24. The magnetic force control apparatus as set forth in claim 23, wherein said control means comprises:
means for sensing the deflection of said probe as caused by a surface force; and
means for controlling the amplitude of said magnetic field applied by said second magnetic source based on the sensed deflection of said probe.

25. The magnetic force control apparatus as set forth in claim 24, wherein said probe comprises a rocking beam balance having a pivot portion and a cantilever portion extending from said pivot portion and on which said first magnetic source is disposed.

26. The magnetic force control apparatus as set forth in claim 24, wherein said probe comprises a cantilever portion having a fixed end and a free end, and said first magnetic source is provided on said cantilever portion.

27. The magnetic force control apparatus as set forth in claim 22, wherein said probe comprising a rocking beam balance having a pivot portion and a cantilever portion extending from said pivot portion and on which said first magnetic source is disposed.

28. The magnetic force control apparatus as set forth in claim 27, wherein said first magnetic source comprises a magnet disposed on said cantilever portion.

29. The magnetic force control apparatus as set forth in claim 27, wherein said first magnetic source comprises a magnetic film.

30. The magnetic force control apparatus as set forth in claim 22, wherein said probe comprises a cantilever portion having a fixed end and a free end, and wherein said first magnetic source is provided on said cantilever portion.

31. The magnetic force control apparatus as set forth in claim 30, wherein said first magnetic source comprises a magnetic film.

32. The magnetic force control apparatus as set forth in claim 30, wherein said first magnetic source comprises a magnetic film having a magnetic moment lying along the length of the cantilever portion.

33. The magnetic force control apparatus as set forth in claim 30, wherein said first magnetic source comprises a magnet disposed on said free end of said cantilever portion.

34. The magnetic force control apparatus as set forth in any one of claims 27, 28, 29, 30, 31, or 33, wherein said first magnetic source has a magnetic moment that lies in a direction that is along said cantilever portion.

35. The magnetic force control apparatus as set forth in any one of claims 22, 23, 24, 25, 26, 27, or 30, further comprising:
means for producing an output signal related to the amplitude of said magnetic field applied by said second magnetic source indicative of a surface force applied to said probe.

36. The magnetic force control apparatus as set forth in claim 22, wherein said second magnetic source comprises an electromagnet, and said first magnetic source comprises a magnet positioned on said probe.

37. The magnetic force control apparatus as set forth in claim 36, wherein said electromagnet is positioned in opposing relation to said probe, and said magnet is a rare earth magnet.

38. The magnetic force control apparatus as set forth in claim 37, wherein said electromagnet has a pole face in the size range of from 1 mm to 2 cm and said pole face is positioned in a range of from 100 µm to 2 cm from said probe, and said rare earth magnet is in a size range of from 10 µm to 100 µm.

39. The magnetic force control apparatus as set forth in any one of claims 27 or 30, wherein said second magnetic source comprises an electromagnet, and said first magnetic source comprises a magnet.

40. The magnetic force control apparatus as set forth in any one of claims 22, 27 or 30, wherein said second magnetic source comprises an electromagnet, and said first magnetic source comprises a thin magnetic film.

41. The magnetic force control apparatus as set forth in claim 40, wherein said magnetic film has a thickness in the range of from 10 nm to 100 nm.

42. The magnetic force control apparatus as set forth in claim 40, wherein said magnetic film comprises a magnetic alloy.

43. The magnetic force control apparatus as set forth in claim 42, wherein said magnetic alloy is a cobalt-chromium alloy.

44. The magnetic force control apparatus as set forth in claim 40, wherein said cobalt-chromium alloy comprises cobalt, chromium and at least one of iron and nickel.

45. The magnetic force control apparatus as set forth in claim 22, wherein said second magnetic source comprises a pair of electromagnetic coils.

46. A method of magnetic force control for a scanning probe, comprising the steps of:

disposing a first magnetic source on said scanning probe, said first magnetic source having a magnetic moment;

disposing a second magnetic source external to said scanning probe to apply a magnetic field in a direction other than parallel to the orientation of said magnetic moment from said second magnetic source to said first magnetic source so as to produce a torque related to the amplitude of the applied magnetic field acting on said scanning probe; and controlling the amplitude of said magnetic field to maintain the deflection of said scanning probe constant during scanning by said scanning probe by sensing the deflection of said scanning probe as caused by a surface force during said scanning and applying said magnetic field with an amplitude derived based on the sensed deflection, wherein said applying step comprises applying at least one of a proportional gain and an integral gain to a signal related to the sensed deflection to derive said amplitude of said magnetic field.

47. The method of claim 46 further comprising the step of:

producing an output signal related to the amplitude of said magnetic field applied by said second magnetic source indicative of a surface force applied to said scanning probe.

48. A magnetic force control apparatus for a scanning probe, comprising:

a probe provided with a first magnetic source with said first magnetic source having a magnetic moment;

a second magnetic source disposed external to said probe to apply a magnetic field to said first magnetic source in a direction other than parallel to the orientation of said magnetic moment so as to produce a torque related to the amplitude of the applied magnetic field acting on said probe; and control means for controlling the amplitude of said magnetic field applied by said second magnetic source to maintain deflection of said probe constant, comprising means for sensing the deflection of said probe as caused by a surface force, and means for controlling the amplitude of said magnetic field applied by said second magnetic source based on the sensed deflection of said probe, wherein said means for controlling the amplitude of said magnetic field includes at least one of a proportional gain and an integral gain in processing a signal related to the sensed deflection of said probe.

49. The magnetic force control apparatus as set forth in claim 48 further comprising:

means for producing an output signal related to the amplitude of said magnetic field applied by said second magnetic source indicative of a surface force applied to said probe.

* * * * *